United States Patent [19]
Urbanick

[11] 3,886,686
[45] June 3, 1975

[54] DOOR CLOSURE SEAL
[75] Inventor: Burton A. Urbanick, La Grange, Ill.
[73] Assignee: Met-L-Wood Corporation, Chicago, Ill.
[22] Filed: May 22, 1973
[21] Appl. No.: 362,659

[52] U.S. Cl. .................... 49/488; 49/490; 49/495; 49/498
[51] Int. Cl. .............................................. E06b 7/22
[58] Field of Search ............ 49/484, 488, 498, 495, 49/490

[56] References Cited
UNITED STATES PATENTS
| | | | |
|---|---|---|---|
| 2,004,413 | 6/1935 | Main | 49/498 X |
| 3,167,825 | 2/1965 | Zoller | 49/490 |
| 3,378,958 | 4/1968 | Parks et al. | 49/495 X |
| 3,512,303 | 5/1970 | Wright | 49/488 X |
| 3,518,792 | 7/1970 | Williamson et al. | 49/488 |

Primary Examiner—Philip C. Kannan
Attorney, Agent, or Firm—Gerald D. Hosier; Hume, Clement, Brinks, Willian, Olds & Cook, Ltd.

[57] ABSTRACT

A composite, one-piece member defining an edge gasket for a container door as well as a dynamic closure seal with an adjacent door frame is disclosed. An elongated channel portion of the member is composed of a relatively rigid plastic, and is adhesively secured to an edge portion of the door. First and second dynamic sealing means are integrally formed with the channel portion, spaced laterally from one another and directed oppositely to the channel leg portions. The first sealing member is composed of an elongated leg or lip portion while the second sealing member is composed of a hollow and resilient member integrally formed with the channel member. The first and second sealing members effect first and second spaced and independent seals with the container door.

1 Claim, 7 Drawing Figures

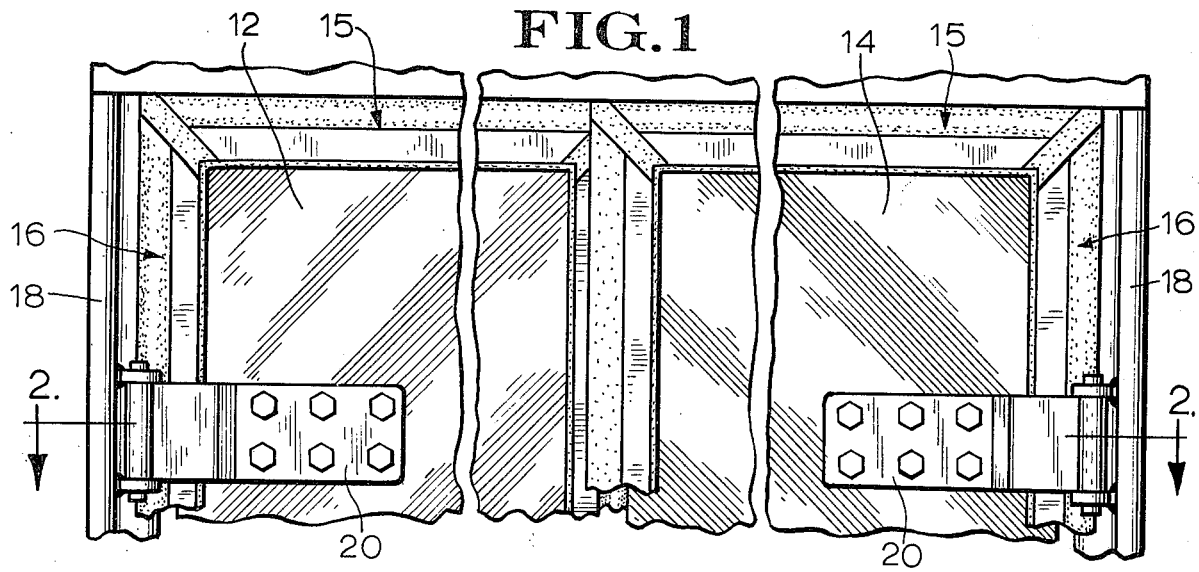
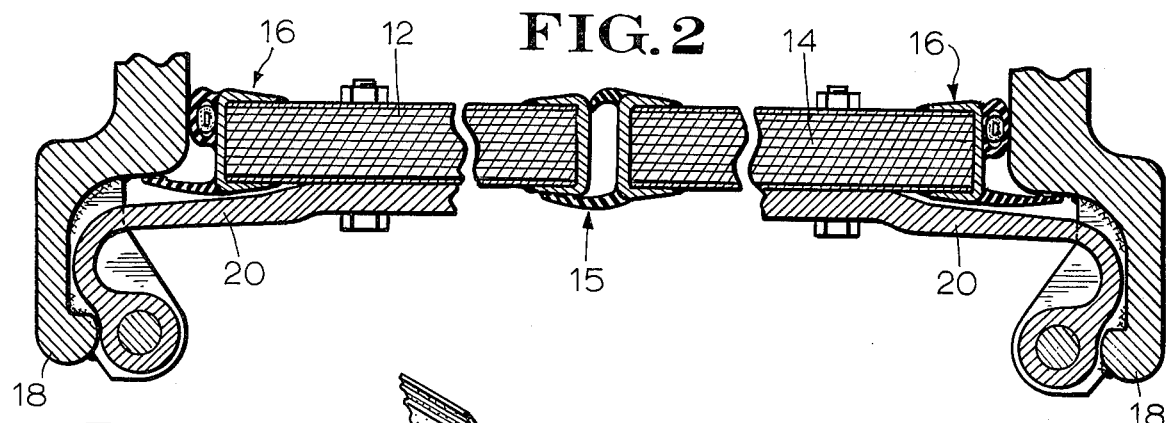
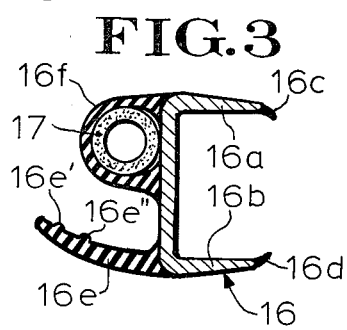
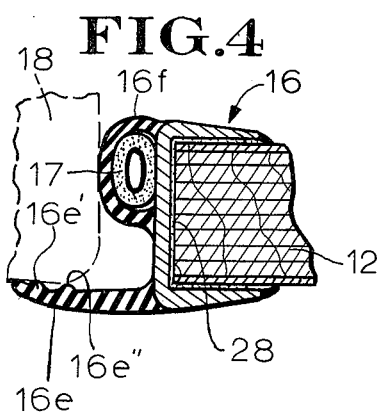
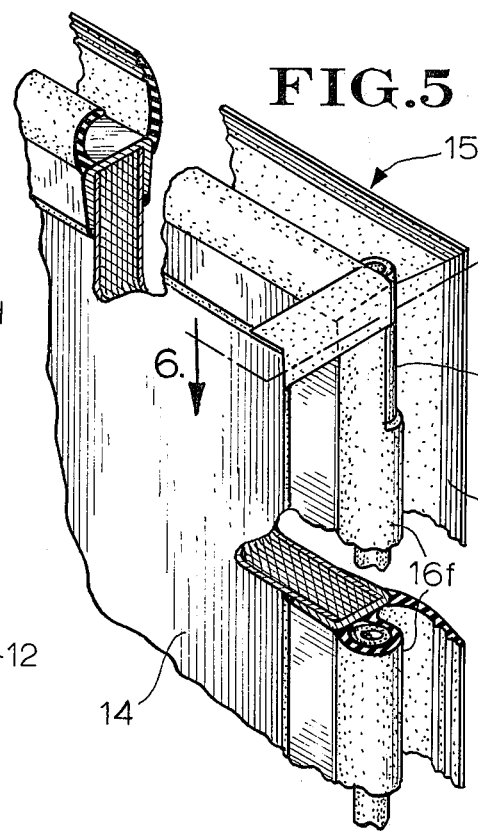
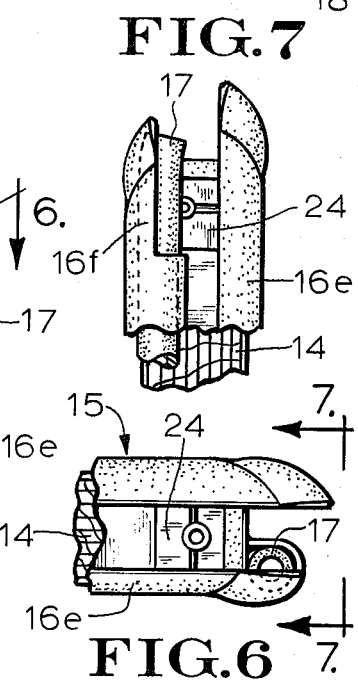

DOOR CLOSURE SEAL

INTRODUCTION

The present invention relates generally to edge gasketing and door closure seals and to a new and improved construction for container doors, such as for use in cargo boxes, semitrailer vans, truck bodies, railway freight cars and the like. More particularly, the present invention is directed to an improvement and modification of the design disclosed and claimed in U.S. Pat. No. 3,518,792-Williamson et al., and assigned to the same assignee as the present invention. The modified design of the present invention is particularly suited to maintaining a hermetic seal under extraordinary container racking forces.

SUMMARY OF THE INVENTION

The present invention, like the predecessor invention disclosed in the aforesaid patent, is directed to a one-piece edge gasket-dynamic closure seal of a composite construction, i.e., an integral structure having two or more portions of differing material composition, and to a new and improved door panel assembly having hermetically sealed edge gasketing and dynamic closure seal means.

The structure of the present invention provides hermetic sealing of an edge portion of a door panel or the like without the use of mechanical fasteners and effects a hermetic door seal by means of a pair of spaced and independent dynamic closure seals. A prime feature of the present invention is the facility to maintain a hermetic seal under certain extraordinarily adverse environmental conditions.

Accordingly, the present invention is directed to a composite member adapted to define an edge gasket for a container door or the like as well as a dynamic closure seal with a member adjacent to the door. The composite member comprises an edge gasket means including an elongated channel member having a pair of opposed leg portions adapted for securely receiving an edge portion of the container door intermediate the opposed leg portions. A first dynamic sealing means comprising a first sealing member composed of an elongated leg or lip portion is integrally formed with the channel member and is directed oppositely to the channel leg portions. There are also provided second dynamic sealing means comprising a second sealing member composed of a hollow and resilient member integrally formed with the channel member, spaced laterally from the first sealing member and directed oppositely to the channel leg portions. The first and second sealing members are constructed and arranged for effecting first and second spaced and independent seals with the container door.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

FIG. 1 is a side elevation of a portion of a container door assembly which assembly is constructed in accordance with the teachings of the present invention;

FIG. 2 is a fragmentary, cross-sectional view taken along lines 2—2 of FIG. 1;

FIGS. 3 and 4 are enlarged plan views of the gasket of the invention showing the gasket in a normal or relaxed state and in engagement with a door post, respectively;

FIG. 5 is a fragmentary perspective view of the edge gasket closure seal of the present invention depicting the structural features of the gasket at the corner of the door;

FIG. 6 is a plan view of the corner detail taken along lines 6—6 of FIG. 5; and

FIG. 7 is an end view of the corner detail taken along lines 7—7 of FIG. 6.

DESCRIPTION OF THE PREFERRED EMBODIMENTS

Referring now to FIG. 1, there is illustrated a portion of the container, such as the rear or side loading area of a semi-trailer truck or the like, of a type having a pair of mated swing-out doors. Only a portion of the doors 12 and 14 are visible in the drawing but the structure of such doors is familiar to those in the art and may also be considered in further detail by reference to the earlier mentioned Williamson et al. U.S. Pat. No. 3,518,792.

The doors 12 and 14 each include a perimeter gasketing, that portion of the door gasketing abutting a door frame 18 being generally designated by the reference numeral 16 and the remaining portion of the peripheral door gasketing being designated by reference numeral 15. The gasketing portion 16 is constructed in accordance with the above-cited Williamson patent and, accordingly, will not be described in detail herein. The gasketing portion 15 is, on the other hand, constructed in accordance with the teachings of the present invention. As will presently be explained, the gasketing 15 is a composite structure adapted to maintain a hermetic edge seal and a resilient dynamic closure seal between the vertical posts of the rectangular door frame 18 and the adjacent edges of each of the doors 12, 14.

The door panel means 12 and 14 may be composed of any suitable material known to the art, although it is preferred from the standpoint of structural integrity and resistance to moisture, etc., that the door panels be constructed of a composite structural laminate comprising, for example, a laminated plywood panel to which there is adhesively bonded on opposed sides, an outer cladding of sheet metal. At any rate, the doors 12 and 14 are appropriately mounted within the outer door frame 18 by respective groups of hinges exemplified by the hinges 20 seen at the top portions of the doors 12 and 14. As seen in FIG. 2, the hinges 20 are each fastened at one end to the doors 12 and 14, respectively, and at their opposite ends are secured to the rearward extension of the door frame 18. It is understood, of course, that the type of hinges and/or fasteners used constitutes no part of the present invention and other well-known mounting arrangements may be employed.

Referring now to FIGS. 2-4, a general understanding may be had of the construction of the composite edge gasket closure seal of the invention and its manner of cooperation with the door panels 12, 14 and the door frame 18. As will presently be considered in detail, the composite members 16 each include a base channel of a generally U-shaped cross-section that is fitted to respective outer edge portions of the door panels. A pair of contoured sealing members of a differing configuration are integrally formed with each base channel and extend oppositely to the leg portions of the channel. The sealing members of the composite members 15 are adapted to engage a flat face portion and a transverse edge portion, respectively, of an adjacent door frame post for effecting a pair of independent closure seals.

The construction and operating features of the composite edge gasket-closure seal member 15, will now be considered in further detail with initial reference to FIGS. 3–4. As there shown, the composite member 15 includes an elongated base channel having a pair of opposed leg portions 16a and 16b that are preferably angulated slightly inwardly so as to securely receive the door panel edge portion therebetween. The channel portion of the composite member 16 is preferably affixed to a door panel, such as the illustrated door panel 12 solely by use of an adhesive mastic 28 in combination with the natural gripping and sealing action of the channel leg portions 16a and 16b. However, it will be understood that the channel portion may, consistent with the present invention, be affixed to a door panel by different means, for example, by use of screws or nails.

Although a uniform layer of mastic 28 is shown in FIG. 3 as having been applied to the interior surface of the base channel, it will be understood by those skilled in the art that the mastic may be applied as a series of vertically aligned parallel beads that spread to form a relatively uniform layer of mastic as the base channel is force fitted onto the edge portion of the door panel 14. Of course, as a further alternative, it is understood that the mastic may be initially applied to the door panel 14, if desired.

In order to provide a requisite structural integrity to the edge frame of the door panel, the base channel of the composite member 16 is preferably comprised of a relatively rigid plastic-like material. Specifically, it is presently preferred that the base channel be composed of a comparatively rigid polyvinyl chloride of approximately a 78 Shore D Durometer. However, to assist in assuring a reliable hermetic seal between the door panel and the base channel portion of the member 16, the tip portions 16c and 16d, respectively, of the channel legs 16a and 16b are formed of a relatively pliable plastic material and are contoured so as to normally project inwardly toward one another thereby to provide an intimate resilient engagement with the opposed side walls of the door panel 14. Preferably the tip portions are composed of a flexible polyvinyl chloride on the order of a 68 Shore A Durometer. Although, as indicated, it is preferred to include the tip portion 16c and 16d, these components of the channel leg portions may be omitted without departing from the present invention. Also, in certain applications, the base channel of the composite member 16 may be composed of a material of a lesser rigidity than that described above.

The composite structure 16 also comprises first and second dynamic sealing means 16e and 16f, respectively, integrally molded to the channel portion and directed oppositely to the channel legs 16a and 16b. The dynamic sealing means 16e and 16f are preferably composed of a relatively pliable plastic-like material which conveniently may be identical to the material forming leg tip portions 16c and 16d. It is understood, however, that in certain applications it may be desirable to employ a material for the sealing lips that is of a different composition and/or durometer than that used for the leg tip portions 16c and 16d. It may also be preferable, in certain instances, to form the channel base portion of the same comparatively flexible material as that used for the dynamic sealing means 16e and 16f.

At any rate, the first dynamic sealing means 16e which, as illustrated, is in the form of an elongated sealing lip is comparatively thick at its point of attachment to the channel member but tapers gradually in thickness toward its tip portion to provide a progressively increasing flexibility. The sealing lip 16e is also formed so as to naturally curve inwardly toward the door panel which it is intended to engage. This inwardly curved configuration assures a resilient and reliable dynamic closure seal that is maintained despite moderate shifting and displacement of the doors or changes in their dimensions due to variations in temperature, etc. It is to be noted that the sealing lip 16e includes on its interior surface a pair of vertically directed contact ridges 16e' and 16e'' that are spaced sufficiently from one another and from the extreme tip portion of the lip 16e so as to provide three distinct contact points with the door panel, as seen in FIG. 4.

The second dynamic sealing means 16f is in the shape of a hollow and resilient member integrally formed with the channel base portion, spaced laterally from the first sealing member 16e and directed oppositely to the channel leg portions 16a and 16b. The hollow sealing member 16f is of a generally U-shaped cross-section having the tips of its respective leg portions integrally formed with the channel base portion. Like the sealing lip 16e, the sealing member 16f is comparatively thick at its two points of attachment to the channel member but tapers gradually in thickness to a uniform and moderate thickness at its bight portion. As seen, for example, in FIG. 3, the outer leg portion of the sealing member 16f, i.e., that leg portion most distant from the sealing lip 16e, is in alignment with the channel leg portion 16a.

In accordance with the present invention, the hollow sealing member 16f is provided with a hollow tubular insert 17 composed of a soft neoprene tubing or the like. The neoprene tubing 17 is disposed within the hollow member 16f by merely drawing the tubing 17 through water or other suitable lubricant and thence into the hollow member 16f. The tubular insert 17 is preferably of an outer diameter corresponding approximately to the interior diameter of the hollow sealing member 16f. The frictional engagement of the two members is adequate to maintain the insert 17 in place within the surrounding member 16f, although, if desired, the members may be adhesively or otherwise secured to one another.

The structure of the gasketing 16 at its point of intersection with the gasketing 15, i.e., the corner of the door panel, is illustrated in FIGS. 5–7. It is presently preferred that the gasketing 15 and 16 each be cut at their point of intersection along a 45° bias to form a mitre joint. The mitre joint is preferrably secured by a corner cover tab 24. Cover tab 24 is disclosed and claimed in Urbanick U.S. Pat. No. 3,717,955, assigned to the same assignee as the present invention, and accordingly its structure and function will not here be considered in detail. However, it is important to here note that the cover tab 24 is of a width corresponding to the width of the base of channel 16 so that the cover tab would interfere with the interior leg of the hollow member 16f of gasketing 16 unless either the cover tab were notched or the interior leg of the hollow member 16f cut away. It is currently preferable to terminate or cut away the interior leg portion of the hollow member 16 so as to permit installation of the cover tab 24. It is also currently preferred to have the flexible tubing 17 extend a substantial distance above the cut-away portion of the inner leg of member 16f. By permitting the neoprene insert 17 to extend beyond the hollow member 16f at the top of each door panel as seen in FIGS. 5–7, it has been found that the probabilities of water leakage at this juncture are minimized.

The manner in which the opposed sealing members 16e and 16f effect the dynamic closure seal with an adjacent member, such as the vertical door frame pillar 18, is best understood by reference to FIG. 4. As shown in this drawing, the exemplary door 12 is shown in a properly closed position with the sealing members 16e and 16f joining in a cooperative action with the door post 18 to effect a hermetic seal therebetween. More specifically, the hollow sealing member 16f is biased into an ellipsoidal shape from its normally generally cylindrical contour due to the relatively close proximity of the member 16f to post 18 thereby effecting a resilient and intimate engagement with the post 18 to effect a dynamic closure seal near the interior surface of the door. The hollow sealing member 16f has an exceptional resilience and, also because of its contour and the presence of the insert 17, it resists the tendancy found in certain other types of dynamic seals to take a cold set.

Closure of the door 12 causes the outer sealing lip 16e to resiliently engage the outer surface or face of the post 18. In completing proper closure of the door, the sealing lip 16e is biased outwardly from its normally curved contour to approach an almost linear condition. The lip 16e, of course, resiliently resists outward deflection and such action results in an intimate and secure engagement at a multiplicity of points between the post 18 and lip 16e, namely, at the extreme tip portion of the lip 16e and at the contact ridges 16e' and 16e".

In summary, the lips 16e and 16f are of a resilience to accommodate door movement due to racking or other dynamic forces without breaching their respective closure seals.

I claim:

1. A composite member adapted to define an edge gasket for a container door or the like as well as a dynamic closure seal with a member adjacent to said door, said composite member comprising:

edge gasket means including an elongated channel member, of a relatively rigid plastic material, having a pair of opposed leg portions adapted for securely receiving an edge portion of said container door intermediate said opposed leg portions;

first dynamic sealing means, of a relatively pliable plastic material, comprising a first sealing member composed of an elongated leg portion integrally formed with said channel member and directed oppositely to said channel leg portions;

second dynamic sealing means, of a relatively pliable plastic material similar to said first dynamic sealing means, comprising a second sealing member composed of a hollow and resilient member integrally formed with said channel member, spaced laterally from said first sealing member and directed oppositely to said channel leg portions, said second dynamic sealing means further including an elongate, flexible and resilient tubular insert member disposed within said hollow member for providing further resilience for said second dynamic sealing means;

said hollow member being partially removed to expose the tubular insert in order to provide an adequate seal along corners of said edge gasket, and said first and second sealing members being constructed and arranged for effecting first and second spaced and independent seals with said container door.

* * * * *